(12) United States Patent
Petermann et al.

(10) Patent No.: US 7,555,799 B2
(45) Date of Patent: Jul. 7, 2009

(54) MOBILE BRIDGE OF GREAT LENGTH AS A SUPPORT CONSTRUCTION FOR AT LEAST ONE TRANSPORT MEANS AND METHOD FOR OPERATING SAME

(75) Inventors: Lutz Petermann, Niederndodeleben (DE); Erhard Pagels, Magdeburg (DE)

(73) Assignee: Magdeburger Förderanlagen und Baumaschinen GmbH, Magdeburg (DE)

( * ) Notice: Subject to any disclaimer, the term of this patent is extended or adjusted under 35 U.S.C. 154(b) by 572 days.

(21) Appl. No.: 11/205,812

(22) Filed: Aug. 17, 2005

(65) Prior Publication Data

US 2007/0234489 A1  Oct. 11, 2007

(30) Foreign Application Priority Data

Aug. 19, 2004 (DE) ........................ 10 2004 040 394

(51) Int. Cl.
*E01D 15/10* (2006.01)
(52) U.S. Cl. ............................................. 14/2.5; 14/2.4
(58) Field of Classification Search .................. 14/2.4, 14/2.5; 198/301; 414/426
See application file for complete search history.

(56) References Cited

U.S. PATENT DOCUMENTS

| | | | | |
|---|---|---|---|---|
| 3,361,248 A | * | 1/1968 | Daymon | ..................... 198/303 |
| 3,422,949 A | * | 1/1969 | Bankauf et al. | .............. 198/301 |
| 4,206,840 A | * | 6/1980 | Hanson | ....................... 198/301 |
| 4,635,311 A | * | 1/1987 | Helmke | ......................... 14/2.5 |
| 5,404,988 A | * | 4/1995 | Konigs | ........................ 198/314 |
| 6,155,400 A | * | 12/2000 | Daigh et al. | ................. 198/301 |

FOREIGN PATENT DOCUMENTS

| | | |
|---|---|---|
| DE | 1759306 | 4/1968 |
| DE | 3627961 C1 | 10/1987 |
| DE | 41 21 360 A1 | 1/1993 |
| DE | 41 28 130 A1 | 2/1993 |
| DE | 42 05 557 A1 | 8/1993 |
| DE | 295 11 784 U1 | 11/1995 |
| FR | 2 266 645 | 10/1975 |

* cited by examiner

*Primary Examiner*—Raymond W Addie
(74) *Attorney, Agent, or Firm*—Collard & Roe, P.C.

(57) ABSTRACT

A mobile bridge of great length is a support construction for at least one transport, which particularly avoids constraints and undefined stresses as a result of temperature variations and/or support lowering movements, for example, to the greatest possible extent. This will guarantee a statically definite system, is essentially accomplished in that the bridge, in its totality, forms a multi-member statically definite system in the vertical plane, and a statically definite continuous carrier in the horizontal plane. The bridge segments of the bridge are connected with one another, in articulated manner, exclusively in the vertical plane, and the bridge is supported by at least three bearing mechanisms of a type A, B, and C having different static valence. Each bearing mechanism of the type A, B, C is carried by a self-propelled, tip-proof traveling mechanism.

13 Claims, 6 Drawing Sheets

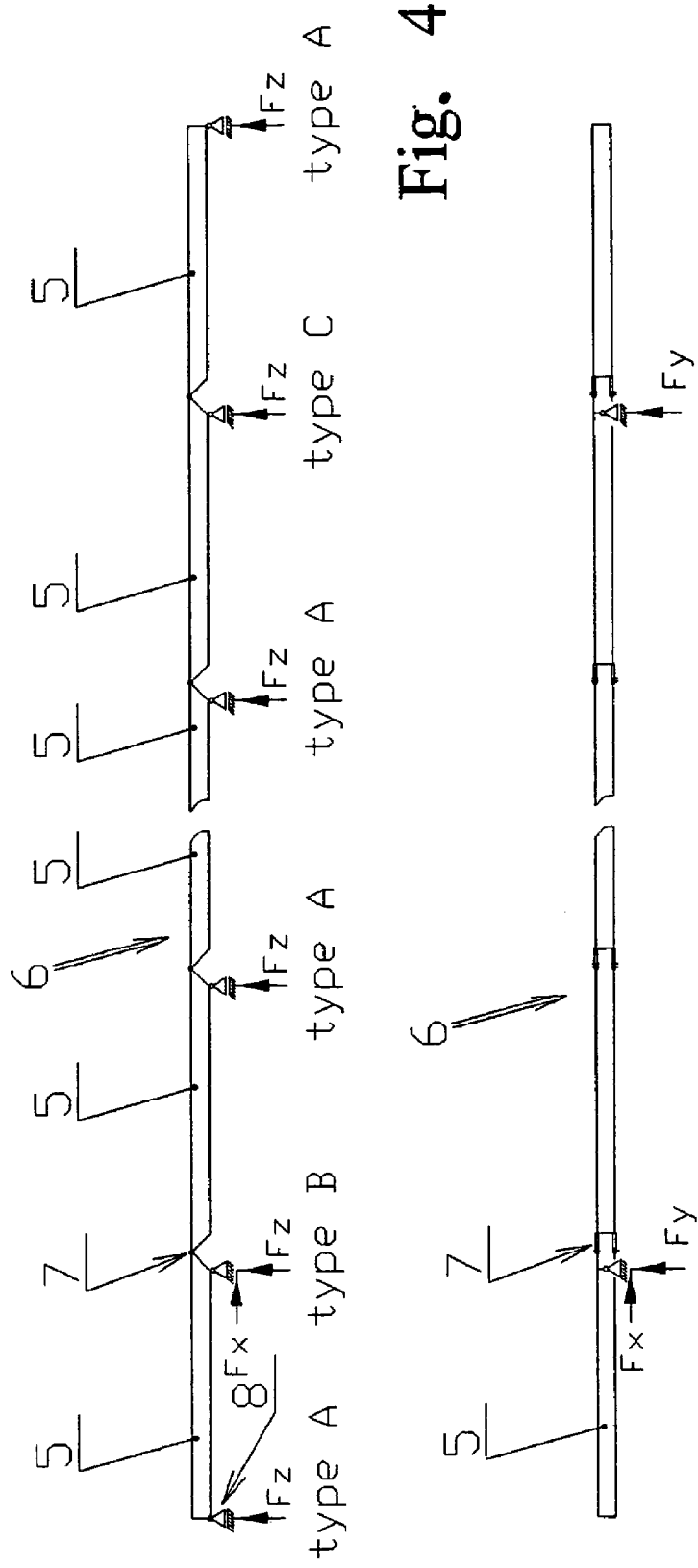

MOBILE BRIDGE OF GREAT LENGTH AS A SUPPORT CONSTRUCTION FOR AT LEAST ONE TRANSPORT MEANS AND METHOD FOR OPERATING SAME

CROSS REFERENCE TO RELATED APPLICATIONS

Applicant claims priority under 35 U.S.C. §119 of German Application No. 10 2004 040 394.5-22 filed Aug. 19, 2004.

BACKGROUND OF THE INVENTION

1. Field of the Invention

The present invention relates to a mobile bridge of great length as a support construction for at least one transport means, having at least two bridge segments disposed in a row one behind the other, which in turn are connected with one another at their faces. The invention furthermore relates to a method for operating such a bridge.

2. The Prior Art

Mobile bridges of the type stated have been known for a long time. These are bridge constructions that support at least one transport means for the transport of solid or liquid transport goods, such as a belt conveyor, a pipeline, and/or the like. Because of their mobility, these bridges allow frequent displacement of specifically these transport means, with little effort and expense.

Thus, such mobile bridges find use, for example, for the transport of bulk goods over long distances. They are preferably used where large dumps are built up or removed in face operations, and very frequent displacement of the face belt by short distances is necessary. In this connection, the bridge moves forward in steps, in the complex, with the related recovery devices or set-down device, by means of self-propelled traveling mechanisms, in the transverse direction of same, i.e. in the longitudinal direction of the dump complex. After this setting step, the recovery device is able to take up the next segment, or the set-down device is able to pile up the next segment.

A bridge of great length, having a plurality of bridge segments disposed one behind the other, which in turn are connected with one another at their faces, and carried by self-propelled traveling mechanisms, is known from U.S. Pat. No. 6,155,400.

The individual bridge segments are connected with one another in articulated manner at their faces, both in the vertical plane and in the horizontal plane, whereby a traveling mechanism is assigned to each bridge segment and is rigidly connected with each bridge segment.

It is true that each traveling mechanism of the bridge, which is estimated as statically indefinite, takes up a defined load, but longitudinal equalization as a result of temperature variations, for example, and/or support lowering movements and accompanying constraints and undefined stresses have not been taken into consideration. The traveling mechanisms must be operated as precisely synchronous as possible, in order to keep the bridge segments in the desired orientation relative to one another, particularly in the longitudinal direction of same. The bridge formed by means of the bridge segments can only travel through curves having a very large radius by means of different speeds of the traveling mechanisms, in the present case caterpillar mechanisms, or transverse to the transport direction.

Furthermore, a large number of solutions is known, which in turn disclose the known bridge principle "beam on two supports" as well as improvements of bearing mechanisms in this regard (DE 42 05 557 A1, DE 11 14 443 A, DE 36 27 961 C1, DE 41 28 130 A1, DE 17 59 306 A, DE 41 21 360 A1, DE 295 11 784 U1). Essentially, here one of the two bearing mechanisms of the "beam on two supports" is configured in such a manner that it permits a pivoting movement of the bridge segment relative to the assigned traveling mechanism, about a horizontal pivot axis oriented transverse to the longitudinal direction of the segment, and otherwise is configured to be rigid. The other bearing mechanism, on the other hand, permits not only pivoting mobility but also displaceability of the bridge segment in the longitudinal direction, and is otherwise configured to be rigid.

Finally, a device for transporting heavy loads is known from FR 2 266 645 A1, whereby lift cylinders are provided in the traveling mechanism carrier of the traveling mechanism, which is equipped with a known pair of caterpillars, which cylinders carry a lift platform that can be locked onto the load to be transported, by means of clamping devices. The lift platform is centrally connected between the lift cylinders with the travelling mechanism carrier, by way of a journal that is guided to move vertically, in such a manner that a tilting movement of the platform relative to the vehicle and a rotational movement of the vehicle relative to the lift platform clamped to the load is possible. The lift platform can accordingly be connected to rotate and tilt with the journal, by way of a spherical shell. Furthermore, it is described that in the case of a platform rigidly locked to the load, there is the possibility of getting the vehicle into any desired travel direction by means of driving the caterpillars of the vehicle in the opposite direction.

SUMMARY OF THE INVENTION

It is an object of the present invention to provide a mobile bridge of great length as a support construction for at least one transport means, which avoids the disadvantages of the state of the art as described initially, namely, in particular, constraints and undefined stresses as a result of temperature variations and/or support lowering movements, for example, to the greatest possible extent, while guaranteeing a statically definite system. Furthermore, the possibility is supposed to be opened up of permitting not only travel in curves and corrective travel, but also a change in the travel direction by 90°, i.e. travel of the bridge in the longitudinal direction of same. Likewise, it is another object of the present invention to provide a method for operating such a bridge.

Proceeding from a bridge of great length as a support construction for at least one transport means, having at least two bridge segments disposed in a row, one behind the other, which in turn are connected at their faces, will accomplish the object according to the invention. That is the bridge, in its totality, forms a multi-member statically definite system in the vertical plane, and a statically definite continuous carrier in the horizontal plane. This is because for one thing, the bridge segments of the bridge are connected with one another, in articulated manner, exclusively in the vertical plane, and for another thing, the bridge is supported by means of at least three bearing mechanisms of a type A, B, and C having different static valence, whereby each bearing mechanism of the type A, B, C is carried by a self-propelled, tip-proof traveling mechanism. In this connection, at least one bridge segment has both a traveling mechanism having a bearing mechanism of the type A, and a traveling mechanism having a bearing mechanism of the type B, and at least one other bridge segment is provided with a traveling mechanism having a bearing mechanism of the type C, while all the other possible bridge segments have a traveling mechanism having a bearing mechanism of the type A.

The bearing mechanism of the type A is essentially configured in that it permits displaceability of the bridge segment in question, relative to the assigned traveling mechanism, within limits, both in the longitudinal direction and in the transverse direction, as well as a pivoting movement about a horizontal pivot axis oriented transverse to the longitudinal direction of the bridge segment. The bearing mechanism of the type B, on the other hand, is configured in such a manner that it permits a pivoting movement of the bridge segment in question relative to the assigned traveling mechanism, within limits, about a horizontal pivot axis oriented transverse to the longitudinal direction of the bridge segment, but otherwise is configured to be rigid. The bearing mechanism of the type C permits displaceability of the bridge segment in question, relative to the assigned traveling mechanism, within limits, in the longitudinal direction of the bridge segment, as well as a pivoting movement of same about a horizontal pivot axis oriented transverse to the longitudinal direction of the bridge segment, but otherwise is configured to be rigid.

By means of the above measure, a statically definite system now exists at all times, even taking into consideration a travel bed having uneven areas, and any resulting lowering of the supports. Furthermore, constraints and undefined tensions resulting from a length change in the said carrier formed by the individual bridge segments, which cannot be precluded, can be avoided, within certain limits.

It is practical if, in this connection, the traveling mechanisms are disposed in an end section of the bridge segment, in each instance.

Furthermore, it is proposed that the traveling mechanisms are configured as dual caterpillar mechanisms, thereby guaranteeing a high level of stability, on the one hand, and a sufficient grip of the traveling mechanism on the travel bed, on the other hand. Likewise, taking into consideration increased stability, it can also be indicated to use traveling mechanisms having wheels or traveling on rails.

Furthermore, it is provided that the transport means is formed by one or more belt conveyors, pipelines, and/or the like.

In a particularly advantageous embodiment of the invention, the displaceability of the bridge segment, in each instance, in the longitudinal direction and/or the transverse direction of same, is implemented by means of a roller or slide guide element, and the pivoting movement about a horizontal pivot axis oriented transverse to the longitudinal direction of the bridge segment is implemented by means of a pivot bearing disposed within the said pivot axis.

It is furthermore within the scope of the invention that in order to guarantee the greatest possible parallelity of the bridge relative to a dump of bulk material or the like, and/or in order to guarantee a certain rated length of the transport means, the traveling mechanisms having the bearing mechanism of the type B and C are configured in such a manner, as well as connected with one another in terms of regulation and control technology in such a manner that the traveling mechanism having the bearing mechanism of the type B functions as the "master" traveling mechanism. Also, the traveling mechanism having the bearing mechanism of the type C, following the "master" traveling mechanism as synchronously as possible, functions as a "slave" traveling mechanism.

The traveling mechanisms having the bearing mechanisms of the type B and C can preferably be synchronized relative to one another by means of a navigation system and/or a laser system and/or other suitable positioning systems.

In another embodiment of the invention, the traveling mechanisms having the bearing mechanisms of the type A can be operated independently of the traveling mechanisms having the bearing mechanism of the type B and C, in terms of regulation and control technology.

In this regard, the combination of traveling mechanism having the bearing mechanism of the type A and the related bridge segment then has one or more regulation and control systems assigned to it, for a determination of the current position of the traveling mechanism having the bearing mechanism of the type A relative to the bridge segment, and any correction of same.

In another embodiment according to the invention, the traveling mechanisms are configured to be able to rotate about a vertical axis of rotation, relative to the bearing mechanism of the type A, B, and C and the bridge segment.

Likewise, it is considered to be advantageous that the combination of traveling mechanism and the related bridge segment has at least one leveling device assigned to it, which in turn is suitable for holding the bridge segment level in the transverse direction of same, even in case of unevenness of the travel bed.

According to an advantageous further embodiment of the invention, it is furthermore provided that a thrust block is assigned to the articulated connection between the bridge segments, in each instance, in the region of the bearing mechanism of the type A, to take over a load in the transverse direction of the bridge segment, i.e. in the travel direction.

In this connection, the articulated connection has at least one means for monitoring the load in the transverse direction of the bridge segment assigned to it.

Finally, at least one spring element that acts in the transverse direction of the bridge segment can be provided between the bearing mechanism of the type A and the related bridge segment.

As far as the operating method according to the invention is concerned, travel of the whole bridge along curves can be carried out with traveling mechanisms in the form of dual caterpillar traveling mechanisms or wheeled traveling mechanisms, by means of different speeds of the individual traveling mechanisms and correction displacements of the whole bridge, or of individual traveling mechanisms that have reached the limits of the permissible displacement path in the longitudinal direction of the bridge, by means of different speeds of the two caterpillars of a traveling mechanism configured as a dual caterpillar traveling mechanism, or of the wheels of a traveling mechanism configured in suitable manner as a wheeled traveling mechanism, respectively by a curve maneuver of individual traveling mechanisms. Also, a traveling movement of the bridge in the longitudinal direction of same is prepared by means of a 90° turn of the traveling mechanisms.

If, on the other hand, a traveling movement of the bridge in the longitudinal direction of same is desired, this is prepared by a 90° turn of the traveling mechanisms.

In this connection, the said 90° turn of traveling mechanisms configured as a dual caterpillar traveling mechanism or a wheeled traveling mechanism is carried out by means of operating the caterpillars of the dual caterpillar traveling mechanisms or the wheels of the suitably configured wheeled traveling mechanisms on one side or both sides, but in opposite directions.

The advantages of the present invention with regard to the state of the art are many. For example, the system is able to even out support lowering movements and length changes resulting from temperature variations, because the bridge construction can move in the longitudinal direction of same, by way of the bearing mechanisms of the type A and C, and is therefore configured to be statically definite both in the horizontal plane and in the vertical plane. Furthermore, an articulation with an axis of rotation transverse to the longitudinal bridge direction is provided, which particularly takes into account uneven areas in the travel bed. Furthermore, because of the rotational mobility between traveling mechanism and bearing construction, rotation of the traveling mechanism about a vertical axis of rotation is guaranteed. Thus, this permits both any desired correction travel and travel of the entire bridge at a slant to the main travel direction or in the longitudinal direction of same. Likewise, in the case of belt conveyors, the risk of the belt misalignment is minimized by means of the bridge construction, which is continuous in the horizontal plane. Also, rails for known traveling trippers or charging hoppers no longer have to be configured to be bendable in the horizontal plane. Finally, greater inaccuracies are permissible during the common travel of the individual traveling mechanisms, whereby the traveling mechanisms having the bearing mechanisms of the type B and C determine the location of the bridge. Also, the traveling mechanisms having the bearing mechanisms of the type A follow with a tolerance that is determined by the displacement path, in a stand-alone position.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention. In the drawings the same reference characters refer to the same structural features throughout the several views, wherein

FIG. 4 shows an extremely schematic side view of a bridge configured according to the invention;

FIG. 5 shows a top view according to FIG. 4;

DETAILED DESCRIPTION OF PREFERRED EMBODIMENTS

Figure 1:
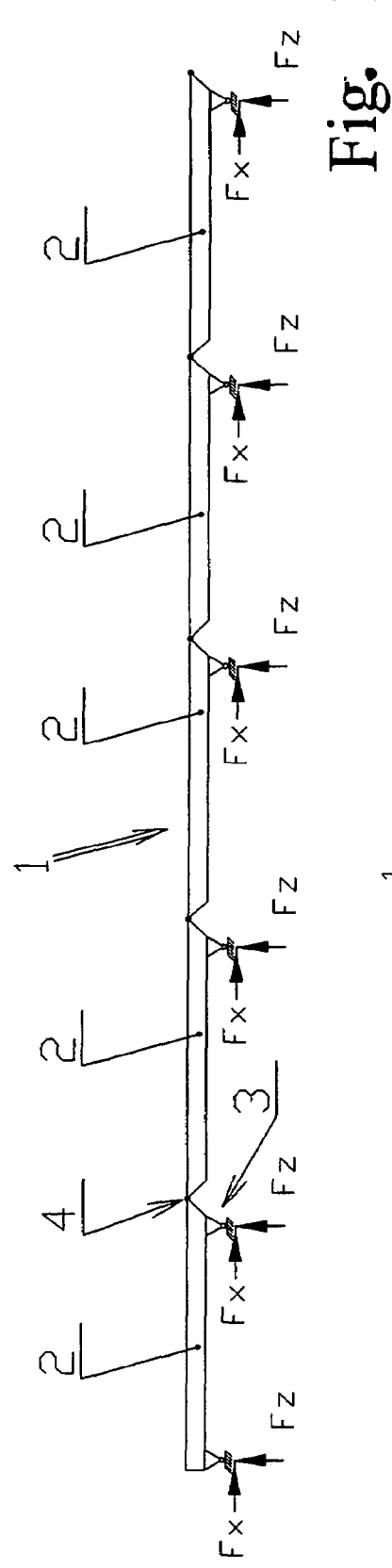
FIG. 1 shows a bridge of great length according to the state of the art, in an extremely schematic side view (vertical plane)
Figure 2:
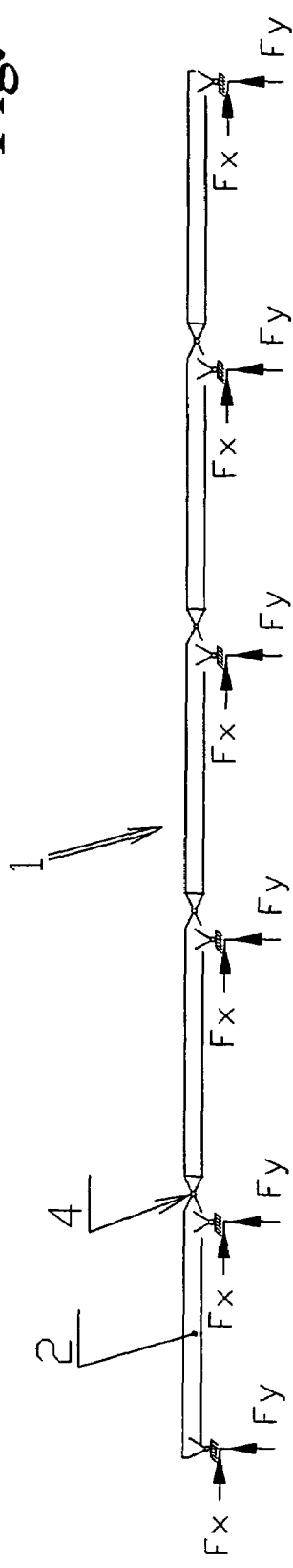
FIG. 2 shows the bridge according to FIG. 1 in a top view (horizontal plane)

Turning now in detail to the drawings, FIGS. 1 and 2 schematically show a bridge 1 of great length according to the state of the art, as it is essentially disclosed, for example, also by the aforementioned U.S. Pat. No. 6,155,400.

This bridge 1 is composed, as already explained above, of a plurality of bridge segments 2 disposed behind one another, which in turn are connected with one another at their faces and are supported by self-propelled traveling mechanisms 3 disposed in an end section of the bridge segment 2, in each instance. A bridge segment 2, here the first bridge segment 2 disposed at the left in the drawing, is supported by two traveling mechanisms 3, while the other bridge segments 2 have one traveling mechanism 3, in each instance, as will surely be easy for a person skilled in the art to understand.

In this connection, the individual bridge segments 2 are connected with one another in articulated manner at their faces, both in the vertical plane and in the horizontal plane, whereby a traveling mechanism 3 is assigned to each bridge segment 2, rigidly connected with it, i.e. at the same time, forces (Fx, Fy, Fz) from all directions can act on the traveling mechanism 3 plus the bridge segment 2.

Figure 3:
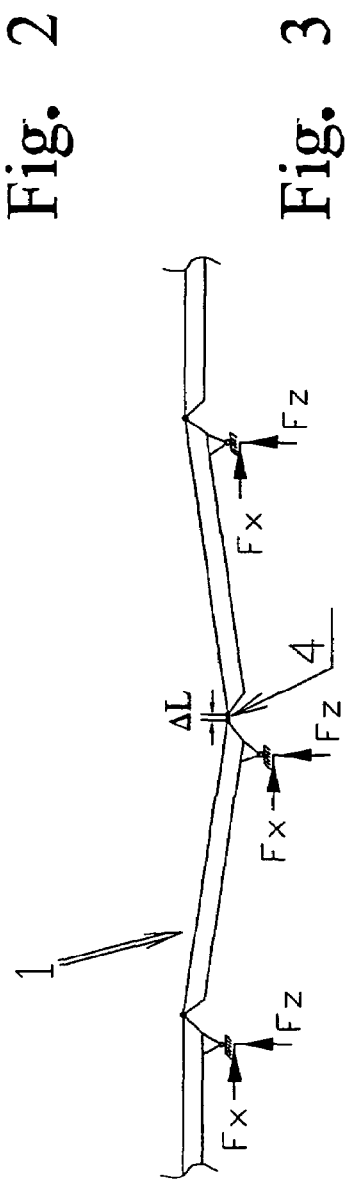
FIG. 3 shows the bridge according to FIGS. 1 and 2 in a state in which a support lowering movement occurs because of an uneven travel bed.

If, as shown in FIG. 3, a lowering of the support occurs as the result of an uneven road bed, for example, the articulated connection 4 that is affected and the connected bridge segments 2 are put under significant stress in the longitudinal direction of the bridge 1, and simply according to calculations, a difference in length ($\Delta L$) results, which must be absorbed, i.e. compensated by the said components.

The system described above is statically indefinite, since although every traveling mechanism 3 can absorb a defined load "Fz," an equalization in length resulting from temperature variations and/or support lowering movements to avoid disadvantageous constraints and undefined stresses, for example, does not occur. Furthermore, the traveling mechanisms 3 must run with extremely accurate synchronicity, in order to keep the bridge segments 2 in the desired orientation relative to one another, particularly in the longitudinal direction. The bridge 1 formed by means of the bridge segments 2 can only travel transverse to the transport direction, or along curves having a very great radius, by means of different speeds of the traveling mechanisms 3.

In order to now be able to counter this circumstance effectively, for one thing, the individual bridge segments 5 of the bridge 6 configured according to the invention and shown in FIGS. 4 and 5 are connected with one another so as to be articulated exclusively in the vertical plane. A suitable articulated connection 7 is shown in detail in FIG. 9, and will be described in greater detail below.

For another thing, the bridge 6 is supported, as a whole, by means of at least three bearing mechanisms of a type A, B, and C, having different static values.

In this regard, a bridge 6 is created in particularly advantageous manner, which forms a multi-link statically definite system in the vertical plane, and a statically definite continuous carrier in the horizontal plane. This bridge is particularly suitable for carrying at least one transport means for transporting solid or liquid transport goods, such as a belt conveyor, a pipeline, and/or the like, which means is not shown in greater detail.

The individual bearing mechanisms of the type A, B, C, in turn, are carried by a self-propelled, tip-proof traveling mechanism 8 that is configured, in a proven embodiment, as a dual caterpillar traveling mechanism (FIGS. 6 to 8), whereby it is practical if the traveling mechanisms 8 are disposed, in each instance, in an end section of the bridge segment 5, in each instance.

Of course it is also possible to provide known wheeled traveling mechanisms or rail traveling mechanisms, which are therefore included in the scope of the invention, but an increased stability of same is absolutely necessary (not shown in greater detail).

Figure 6:
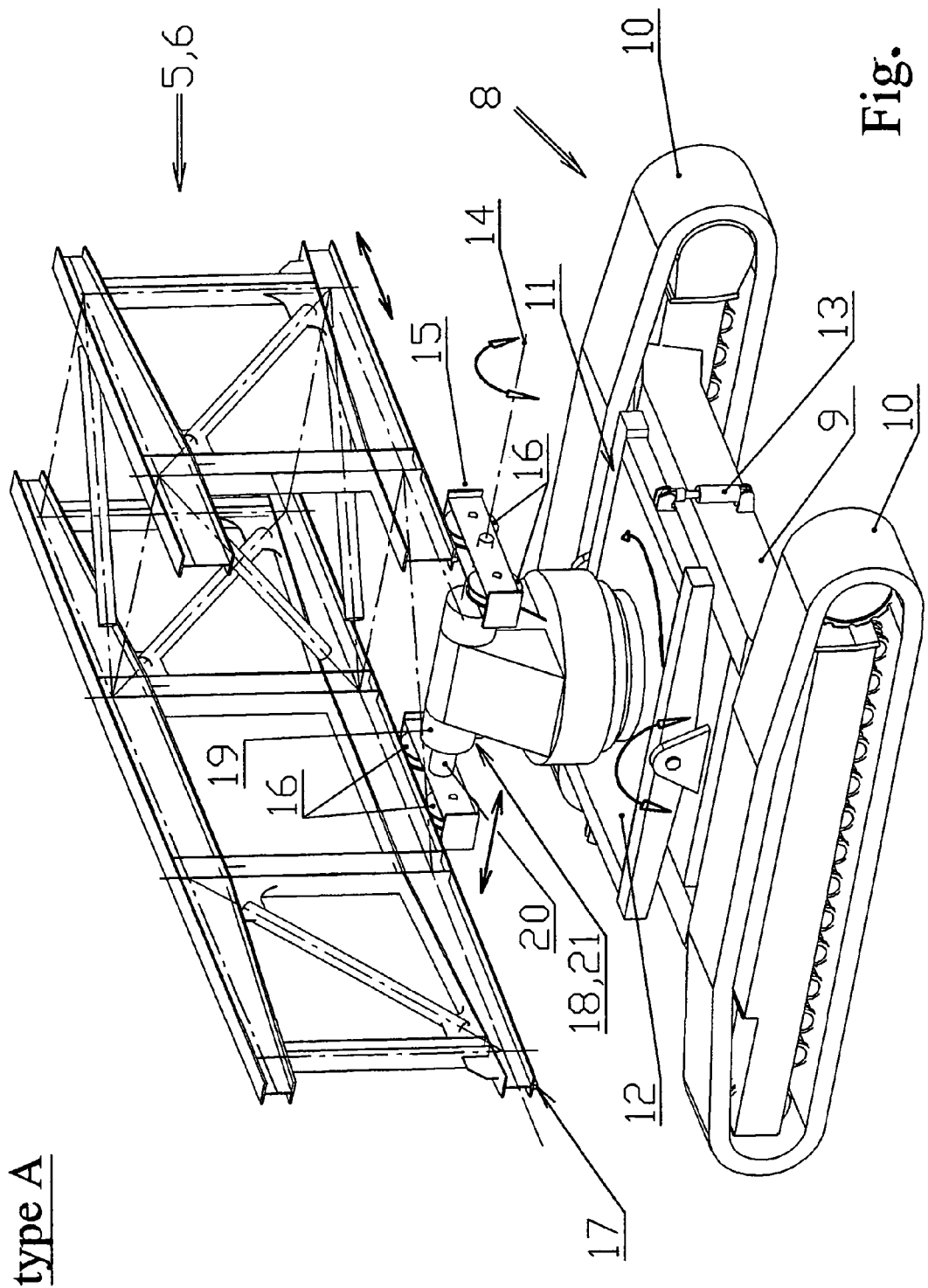
FIG. 6 shows a perspective view of a traveling mechanism with the supported bridge segment having a bearing mechanism of a type A.

FIG. 6 shows the support region of a bridge segment 6 having a bearing mechanism of the type A, which in turn is carried by a traveling mechanism 8 of the type described above, namely a dual caterpillar traveling mechanism having a traveling mechanism substructure 9 and the caterpillars 10 disposed on both sides of the substructure. Preferably it is operated by means of known electric or hydraulic travel drives, not shown in greater detail.

A so-called leveling device 11 is disposed on the traveling mechanism substructure 9, which device in turn consists of a leveling table 12 mounted in articulated manner about an axis that is oriented transverse to the main direction of travel of the traveling mechanism 8. This table 12 in turn can be adjusted by means of at least one piston/cylinder unit 13, which is preferably operated hydraulically.

The leveling table 12 in turn carries the bearing mechanisms of the type A, on which the bridge segment 5 is then supported.

By means of the said leveling device 11, the possibility is advantageously opened up of holding the bridge segment 5 level in the transverse direction of same, even in case of uneven areas of the road bed.

The bearing mechanism of the type A is essentially configured in such a manner that it permits displaceability of the bridge segment 5, relative to the related traveling mechanism 8, within limits, both in the longitudinal direction and in the transverse direction of the segment, as well as a pivoting movement about a horizontal pivot axis 14 that is oriented transverse to the longitudinal direction of the bridge segment 5.

In the present instance, the displaceability of the bridge segment 5 in the longitudinal direction is implemented by means of a roller guide element 15 in the form of a roller table having guide rollers 16, which in turn accommodate lower stays 17 of the bridge segment 5.

According to a practical embodiment, said roller guide element 15 in the form of a roller table is furthermore displaceable, within limits, by means of a slide guide element 18, in the transverse direction of the bridge segment, whereby the slide guide element 18 is formed, in the present case, by means of an axle 20 guided in the slide bearing 19.

It is particularly advantageous if the slide bearing 19 and the axle 20 form a pivot bearing 21, at the same time, which permits the said pivoting movement of the bridge segment 5 about the horizontal pivot axis 14 that is oriented transverse to the longitudinal direction of said segment.

However, the invention is not limited to the above preferred embodiment, but rather includes any known design configuration with which a displacement of the bridge segment 5 relative to the traveling mechanism 8, in the transverse and longitudinal direction of the bridge segment 5, as well as the said pivoting movement of same can be accomplished.

Because of the measure described above, the bearing mechanism of the type A can only absorb vertical forces "Fz" (support forces). No forces are absorbed in the longitudinal direction and in the transverse direction of the bridge segment 5, because of the limits set by the slide guide element 18.

Figure 7:
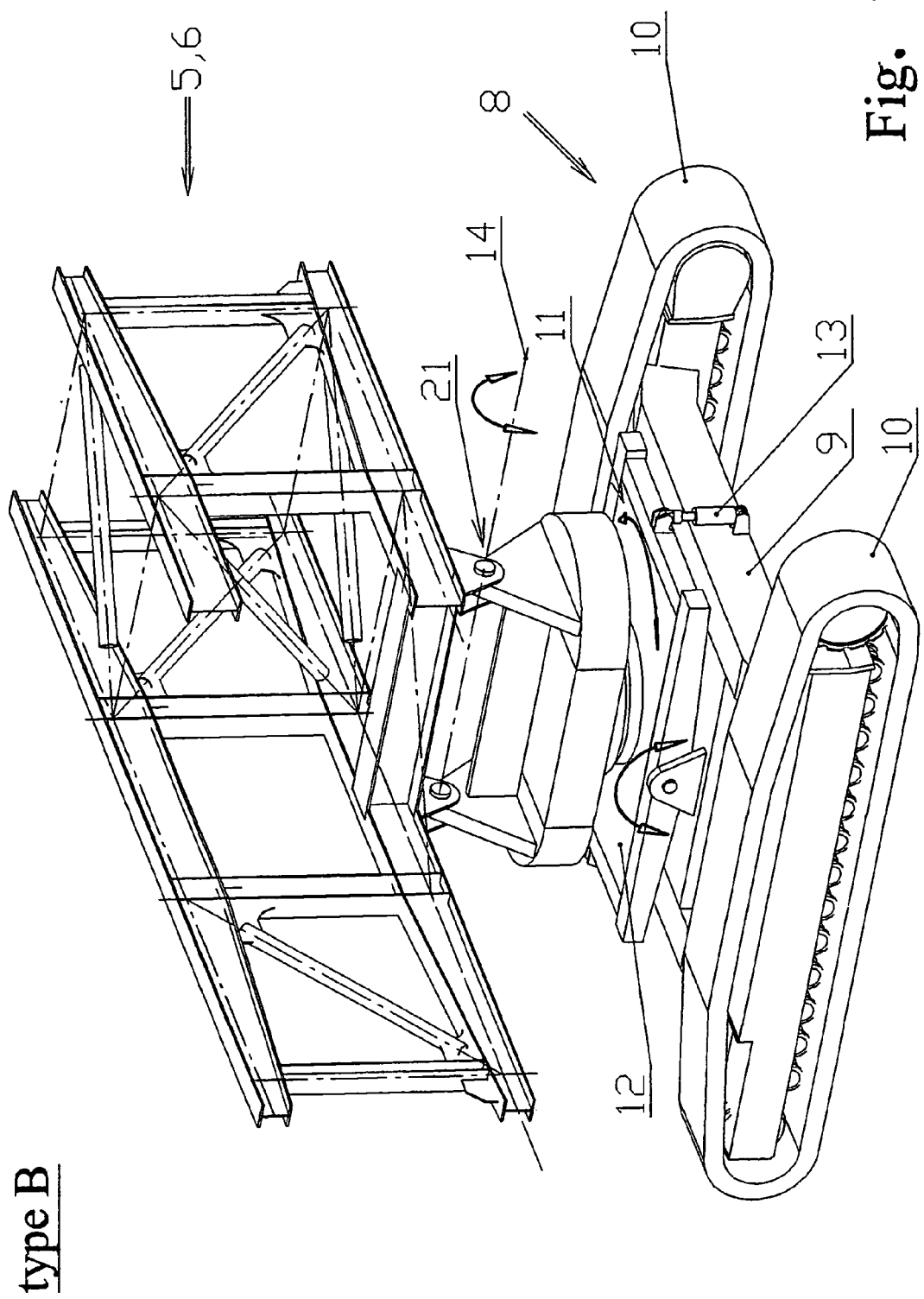
FIG. 7 shows a perspective view of a traveling mechanism with the supported bridge segment having a bearing mechanism of a type B.

The bearing mechanism of the type B differs, according to FIG. 7, from the bearing mechanism of the type A, in particular, in that mobility of the bridge segment 5 relative to the traveling mechanism 8, in the longitudinal direction and in the transverse direction of the bridge segment 5, is blocked. Hence, only pivoting movements of the bridge segment 5 about the pivot axis 14 are permitted, by means of the pivot bearing indicated as 21.

Therefore, the bearing mechanism of the type B is suitable for absorbing both vertical loads "Fz" and horizontal loads in two directions "Fx," Fy."

Figure 8:
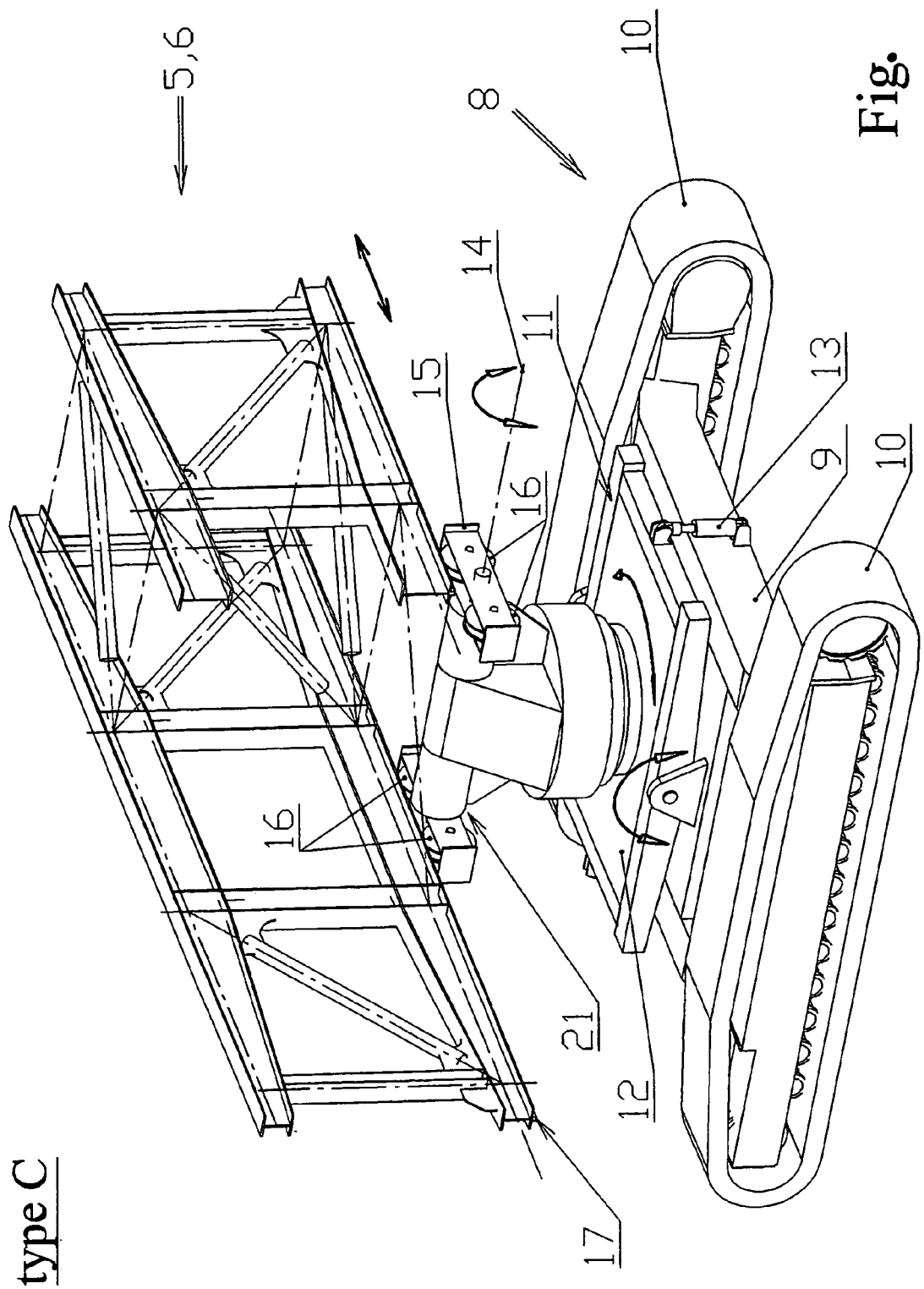
FIG. 8 shows a perspective view of a traveling mechanism with the supported bridge segment having a bearing mechanism of a type C.

In contrast, according to FIG. 8, the bearing mechanism of the type C is configured in such a manner that it permits displaceability of the bridge segment 5 in the longitudinal direction of same, relative to the traveling mechanism 8, as well as a pivoting movement about the pivot axis 14. However, it is configured to be rigid in the transverse direction of the bridge segment 5. This bearing mechanism is able to absorb horizontal loads in the transverse direction "Fy," in addition to the vertical load "Fz."

It is surely easy for a person skilled in the art to understand that said horizontal loads in the transverse direction "Fy" can be significant, for example as a result of the wind load. In this regard, it can be indicated to provide supporting horizontal rollers on the roller slide guide element 15, which support the bridge segment 5 in the transverse direction, and are suitable for effectively transferring these horizontal loads "Fy" to the traveling mechanism 8, by way of the bearing mechanism (not shown in greater detail).

As is further evident from FIGS. 4 and 5, it is provided that at least one bridge segment 5 of the bridge 6 has both a traveling mechanism 8 having a bearing mechanism of the type A, and a traveling mechanism having a bearing mechanism of the type B. Also, at least one other bridge segment 5 is provided with a traveling mechanism 8 having a bearing mechanism C, while all the other bridge segments 5 that might be present have a traveling mechanism 8 having a bearing mechanism of the type A.

According to a preferred embodiment, the first bridge segment 5, disposed on the left in the present case, has both a traveling mechanism 8 having a bearing mechanism of the type A, and a traveling mechanism having a bearing mechanism of the type B. Also, the bridge segment 5 disposed second from the right has a traveling mechanism 8 having a bearing mechanism of the type C, while the other bridge segments 5 have a traveling mechanism 8 having a bearing mechanism of the type A.

However, the invention is not limited to this preferred embodiment, but rather also includes arrangements of bridge segments 5 that are increased or decreased in their number, as long as at least one bridge segment 5 is equipped both with a traveling mechanism 8 having a bearing mechanism of the type A and a traveling mechanism 8 having a bearing mechanism of the type B, and at least one bridge segment 5 is equipped with a traveling mechanism 8 having a bearing mechanism of the type C.

With this arrangement, only two traveling mechanisms 8, namely the traveling mechanism 8 having a bearing mechanism B and a bearing mechanism C become active in the horizontal plane, in the present case, thereby causing the bridge 6 to be mounted in statically definite manner, in the form of a continuous carrier.

It is true that the bearing mechanisms of the type A also act in the vertical plane, but because of the articulation of the bridge segments 5 relative to one another, static definiteness is guaranteed.

The loads resulting from incline, wind, acceleration, etc. are thereby decisively applied by the traveling mechanisms 8 having the bearing mechanisms 8 of the type B and C. The traveling mechanisms having bearing mechanisms of the type A are only involved to an extent that can be ignored, by way of friction. Forces in the longitudinal direction of the bridge segment 5 are absorbed, to the greatest possible extent, by the traveling mechanism 8 having the bearing mechanism of the type B.

Furthermore, rotational mobility between each traveling mechanism 8 and the bearing mechanism of the type A, B, C, in each instance, is viewed as being particularly advantageous, making the traveling mechanism 8 able to rotate underneath the bridge construction, about a vertical axis of rotation (FIGS. 6 to 8).

This means, in practice, that when the caterpillars 10 of a dual caterpillar traveling mechanism are moving at different speeds or in opposite directions, the traveling mechanism 8, in each instance, can rotate underneath the bridge construction of the bridge segment 5. Thereby one or more traveling mechanisms 8 and/or the entire bridge 6 can be moved even at a slant to the main direction of travel, or, if all the traveling mechanisms 8 are rotated by 90°, the bridge 6 can be moved in the longitudinal direction of same.

Certainly this measure is not restricted to dual caterpillar traveling mechanisms, but rather can also include appropriately configured wheeled traveling mechanisms.

As far as rail-linked traveling mechanisms 8 is concerned, a change in direction of same, while it appears to be possible, can only be accomplished with increased technical effort and expense, due to system conditions.

The rotational mobility is preferably accomplished by means of a conventional ball-joint connector or an axial bearing preferably disposed between the leveling table 12 and the bearing construction of the bearing mechanism of the type A, B, and C, in each instance, not shown in greater detail.

If it happens that "bridge travel" is planned, it must be provided, in order to guarantee the greatest possible parallelity of the bridge 6 relative to a dump of bulk material or the like, and/or in order to guarantee a certain rated position of the transport means. Also, the traveling mechanisms 8 having the bearing mechanism of the type B and C are configured in such a manner, as well as connected with one another in terms of regulation and control technology in such a manner that the traveling mechanism 8 having the bearing mechanism of the type B functions as the "master" traveling mechanism 8. Also, the traveling mechanism 8 having the bearing mechanism of the type C, following the "master" traveling mechanism 8 as synchronously as possible, functions as a "slave" traveling mechanism 8.

Deviations in the speeds of these two traveling mechanisms 8, within certain limits, do not result in any technical problems of the bridge 6 itself, because the latter orients itself automatically, in accordance with the specially configured bearing mechanisms of the type A, B, C.

In this regard, it is also provided that the traveling mechanisms 8 having the bearing mechanisms of the type B and C can be synchronized relative to one another by means of a navigation system, for example GPS (Global Positioning System), and/or by means of a laser system and/or other suitable positioning systems.

The traveling mechanisms 8 having bearing mechanisms of the type A, in contrast, can be operated independently of the traveling mechanisms 8 having the bearing mechanisms of the type B and C, to the greatest possible extent, in terms of regulation and control technology. Also, the combination of traveling mechanism 8 having the bearing mechanism of the type A and the related bridge segment 5 has one or more regulation and control systems assigned to it, to determine the current position relative to one another, and to correct same, if necessary.

Thus, for example, path sensors, end switches and/or other known position detection systems, not shown in greater detail, can be installed, which in turn detect deviations from predetermined position detection systems and generate corresponding signals, which in turn serve to control the drives of the individual caterpillars 10 of the traveling mechanism 8, or to change their speed, in order to return to the said rated position, by means of an electronic regulation and control device.

This correction becomes practicable by means of a regulation window that has been selected to be of an appropriate size, i.e. no increased precision is required.

As explained in detail above, both the bearing mechanisms of the type A and the bearing mechanisms of the type C are displaceable in the longitudinal direction of the bridge segment 5, relative to same.

This displacement position can also be detected and corrected in the same manner, i.e. as explained above.

The correction can take place by means of the curve movement of the entire traveling mechanism 8, as described above, whereby this curve travel is advantageously supported by the rotational mobility of the traveling mechanism 8 relative to the bridge construction.

If, for example, a certain deviation from the rated position is found, or if such a deviation is sensed, signals are generated and sent to the drives of the individual caterpillars 10 of the traveling mechanism 8 in question (dual caterpillar traveling mechanism). This will cause one of the two caterpillars 10 of the traveling mechanism 8 to travel somewhat faster or slower, for example, forcing the traveling mechanism 8 into a curve having a relatively large radius. Thus, the traveling mechanism 8 can move in the direction of the rated position again, during the next travel movement.

Essentially, therefore, curve travel and correction displacements of individual traveling mechanisms 8 or of the entire bridge 6 can be performed by means of different speeds of individual traveling mechanisms 8 and/or the two caterpillars 10 of one or more traveling mechanisms 8.

Finally, there is the possibility of including the bearing mechanisms of the type A, i.e. their traveling mechanisms 8, in the take-over of loads also in the main travel direction or in the transverse direction of the bridge segment 5, if necessary, in that they are moved, for example in the case of extreme wind, against an end stop not shown in greater detail (end of the displacement path in the transverse direction), whereby then, however, the static definiteness of the system, which is normally desired, is eliminated.

Figure 9:
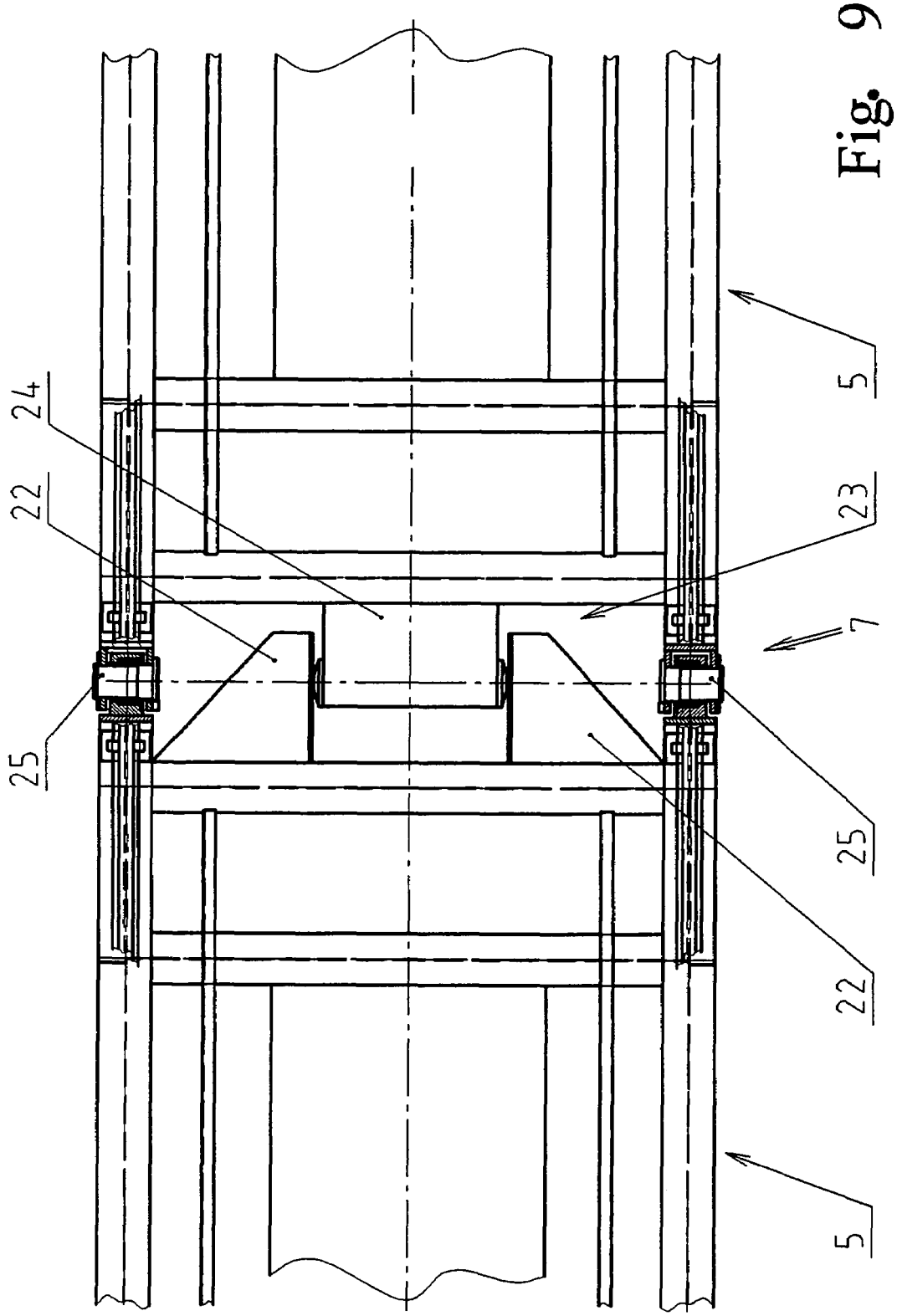
FIG. 9 shows a top view of the connecting segment on the face of two bridge segments, in the region of a bearing mechanism of the type A.

FIG. 9 shows the articulated connection 7, already mentioned above, which in turn permits a connection of the bridge segments 5 exclusively in the vertical plane, according to the invention.

This articulated connection 7 is advantageously complemented with a thrust block 23 having two stops 22 that are disposed opposite one another, in the transverse direction of the bridge segment 5, between which a block center part 24 is located, by means of which transverse forces are passed from one bridge segment 5 to the other.

It is also recommended to monitor the loads that are in effect. This can be done, for example, by means of a known load measurement pin, not shown in greater detail, in the articulations 25 of the articulated connection 7.

Likewise, it is viewed as being advantageous if at least one spring element that acts in the transverse direction of the bridge segment 5 is provided between the bearing mechanism of the type A and the related bridge segment 5 (not shown in greater detail).

By means of this measure, the bearing mechanisms of the type A can be gradually included in the load take-over, as a function of the deviation in position from a predetermined rated position.

The more the bridge 6 deforms in the load direction, the more the corresponding bearing mechanism of the type A helps to support it, and relieves stress on the bridge construction of the bridge 6.

Although only a few embodiments of the present invention have been shown and described, it is to be understood that many changes and modifications may be made thereunto without departing from the spirit and scope of the invention as defined in the appended claims.

REFERENCE SYMBOL LIST 1-bridge
2-bridge segments
3-traveling mechanisms
4-articulated connection
5-bridge segments
6-bridge
7-articulated connection
8-traveling mechanisms
9-traveling mechanism substructure
10-caterpillars
11-leveling device
12-leveling table
13-piston/cylinder unit
14-pivot axis
15-roller guide element
16-guide rollers
17-lower stays
18-slide guide element
19-slide bearing
20-axle
21-pivot bearing
22-stop
23-thrust block
24-block center part
25-articulations
"ΔL"-difference in length
"Fx"-load in the longitudinal direction of the bridge 1, 6
"Fy"-load in the transverse direction of the bridge 1, 6
"Fz"-load in the vertical direction of the bridge 1, 6
A, B, C-bearing mechanism types

What is claimed is:

1. Mobile bridge (6) of great length as a support construction for at least one transport means, having at least two bridge segments (5) disposed in a row one behind the other, which are connected with one another at their faces, wherein the bridge (6), in its totality, forms a multi-member system in the vertical plane, and a continuous carrier in the horizontal plane, wherein the at least two bridge segments (5) of the bridge (6) are connected with one another, in the vertical plane, wherein the bridge (6) is supported by means of at least three bearing mechanisms of a type A, B, and C which are carried by a self-propelled, tip-proof traveling mechanism (8), whereby at least one bridge segment (5) has both a traveling mechanism (8) having a bearing mechanism of the type A, and a traveling mechanism (8) having a bearing mechanism of the type B, and at least one other bridge segment (5) is provided with a traveling mechanism (8) having a bearing mechanism of the type C, while all the other possible bridge segments (5) have a traveling mechanism (8) having a bearing mechanism of the type A, and whereby the bearing mechanism of the type A is configured in such a manner that it permits displaceability of the bridge segment (5) relative to the assigned traveling mechanism (8), both in the longitudinal direction and in the transverse direction of the bridge segment (5), as well as a pivoting movement about a horizontal pivot axis (14) oriented transverse to the longitudinal direction of the bridge segment (5), the bearing mechanism of the type B is configured in such a manner that it permits a pivoting movement of the bridge segment (5) relative to the assigned traveling mechanism (8), about a horizontal pivot axis (14) oriented transverse to the longitudinal direction of the bridge segment (5), and the bearing mechanism of the type C is configured in such a manner that it permits displaceability of the bridge segment (5) in question, relative to the assigned traveling mechanism (8), within limits, in the longitudinal direction of the bridge segment (5), as well as a pivoting movement of same about a horizontal pivot axis (14) oriented transverse to the longitudinal direction of the bridge segment (5); and wherein the traveling mechanisms (8) having the bearing mechanisms of the type A are operated independently of the traveling mechanisms (8) having the bearing mechanism of the type B and C, in terms of regulation and control technology, while the traveling mechanisms (8) having the bearing mechanism of the type B and C are connected with one another in terms of regulation and control technology.

2. Mobile bridge (6) according to claim 1, wherein the traveling mechanisms (8) are disposed in an end section of the bridge segment (5), in each instance.

3. Mobile bridge (6) according to claim 1, wherein the traveling mechanisms (8) are configured as dual caterpillar traveling mechanisms, wheeled traveling mechanisms, or rail traveling mechanisms.

4. Mobile bridge (6) according to claim 1, wherein the transport means is formed by one or more belt conveyors, and/or pipe conveyors.

5. Mobile bridge (6) according to claim 1, wherein the displaceability of the bridge segment (5), in the longitudinal direction and/or the transverse direction, is implemented by means of a roller or slide guide element (15, 18), and the pivoting movement about a horizontal pivot axis (14) oriented transverse to the longitudinal direction of the bridge segment (5) is implemented by means of a pivot bearing (21) disposed within the said pivot axis (14).

6. Mobile bridge (6) according to claim 1, wherein the combination of traveling mechanism (8) having the bearing mechanism of the type A and the related bridge segment (5) has one or more regulation and control systems assigned to it, for a determination of the current position of the traveling mechanism (8) having the bearing mechanism of the type A relative to the bridge segment (5), and any correction.

7. Mobile bridge (6) according to claim 1, wherein the traveling mechanisms (8) are configured to be able to rotate about a vertical axis of rotation, relative to the bearing mechanism of the type A, B, C and the bridge segment (5).

8. Mobile bridge (6) according to claim 1, wherein the combination of traveling mechanism (8) and the related bridge segment (5) has at least one leveling device (11) assigned to it, which is suitable for holding the bridge segment (5) level in the transverse direction, even in case of unevenness of the road bed.

9. Mobile bridge (6) according to claim 1,
wherein a thrust block (23) is assigned to an articulated connection (7) between the bridge segments (5) in the region of the bearing mechanism of the type A, to take over a load in the transverse direction of the bridge segment (5) which is in the travel direction.

10. Mobile bridge (6) according to claim 9,
wherein the articulated connection (7) has at least one means for monitoring the load in the transverse direction of the bridge segment (5) assigned to it.

11. Mobile bridge (6) according to claim 1,
wherein there is at least one spring element that acts in the transverse direction of the bridge segment (5) is disposed between the bearing mechanism of the type A and the related bridge segment (5).

12. Mobile bridge (6) according to claim 1,
wherein the traveling mechanisms (8) having the bearing mechanism of the type B and C are connected with one another in terms of regulation and control technology in such a manner that the traveling mechanism (8) having the bearing mechanism of the type B functions as the "master" traveling mechanism (8), and the traveling mechanism (8) having the bearing mechanism of the type C, following the "master" traveling mechanism (8) as synchronously as possible, functions as a "slave" traveling mechanism (8).

13. Mobile bridge (6) according to claim 12,
wherein the traveling mechanisms (8) having the bearing mechanisms of the type B and C can be synchronized relative to one another by means of a navigation system or by means of a laser system or other suitable positioning systems.

* * * * *